(No Model.)

A. W. KRAPF.
STOVE PIPE THIMBLE.

No. 245,385. Patented Aug. 9, 1881.

WITNESSES
Fred. G. Dieterich.
F. C. Dieterich.

By his Attorneys
C. A. Snow & Co.

INVENTOR
Andrew W. Krapf,

United States Patent Office.

ANDREW W. KRAPF, OF BLISSFIELD, MICHIGAN, ASSIGNOR OF ONE-HALF TO FREDERICK G. BEAGLE, OF SAME PLACE.

STOVE-PIPE THIMBLE.

SPECIFICATION forming part of Letters Patent No. 245,385, dated August 9, 1881.

Application filed May 24, 1881. (No model.)

*To all whom it may concern:*

Be it known that I, ANDREW W. KRAPF, of Blissfield, in the county of Lenawee and State of Michigan, have invented certain new and useful Improvements in Stove-Pipe Thimbles; and I do hereby declare that the following is a full, clear, and exact description of the invention, which will enable others skilled in the art to which it appertains to make and use the same, reference being had to the accompanying drawings, which form a part of this specification.

Figure 1:
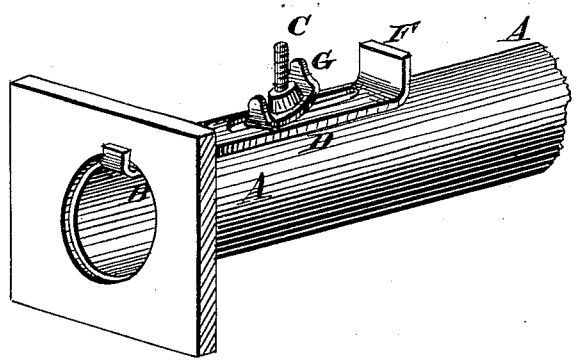
Figure 2:
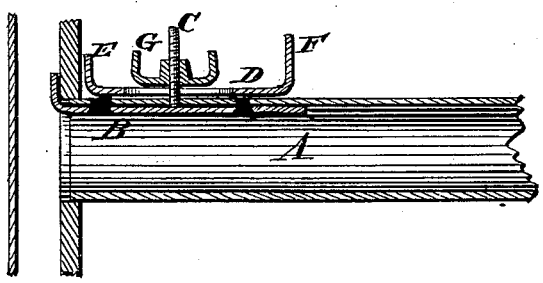
Figure 3:
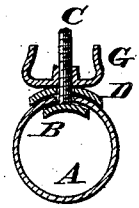

Figure 1 is a perspective view. Fig. 2 is a longitudinal vertical sectional view, and Fig. 3 is a vertical cross-section.

Corresponding parts in the several figures are denoted by like letters of reference.

This invention relates to stove-pipe thimbles; and it consists in certain improvements in the construction of the same, which will be hereinafter fully described, and particularly pointed out in the claims.

In the drawings hereto annexed, A represents a length of stove-pipe, upon the inside of which is riveted a bent or hooked rod, B, projecting slightly beyond one end of the said pipe, as shown, and having a threaded rod, C, which projects upward through an opening in the said pipe. Upon the said threaded rod is adjusted a slotted slide, D, provided at one end with a hook or upturned end, E, facing the hook B, and at the other end with a handle, F, by which it may be conveniently manipulated. A thumb-nut, G, is provided upon the bolt or threaded rod C, which said nut may be readily tightened, in order to secure the slide D in the position to which it may be adjusted.

In practice the nut G is loosened, so as to permit the hook B to be lowered and the pipe to be inserted through the opening where it is to be secured. When the pipe has been properly adjusted the slide D is moved up to the outer side of the wall or opening and the thumb-nut G tightened, thus securing the device in position. To remove the pipe it is only necessary to loosen the nut.

This invention is simple, convenient, and easily adjusted or removed. It is obvious that it may be applied equally well to walls or ceilings of unequal thickness.

Having thus described my invention, I claim and desire to secure by Letters Patent of the United States—

1. As an improvement in stove-pipe thimbles, the pipe A, having hook B and means for adjusting the same, as herein described, for the purpose set forth.

2. The combination of the pipe A, having riveted hook B, provided with threaded rod or bolt C, the slotted and hooked slide D, and the thumb-nut G, as herein described, for the purpose shown and specified.

In testimony that I claim the foregoing as my own I have hereto affixed my signature in presence of two witnesses.

ANDREW W. KRAPF.

Witnesses:
CHARLES L. BEAGLE,
JOHN F. RATHFUSS.